United States Patent
Labatte et al.

[19]

[11] Patent Number: 5,901,311
[45] Date of Patent: May 4, 1999

[54] ACCESS KEY PROTECTION FOR COMPUTER SYSTEM DATA

[75] Inventors: Timothy E. W. Labatte; Orville H. Christeson, both of Portland; Mark S. Shipman, Hillsboro, all of Oreg.

[73] Assignee: Intel Corporation, Santa Clara, Calif.

[21] Appl. No.: 08/768,643

[22] Filed: Dec. 18, 1996

[51] Int. Cl.⁶ ..................................................... G06F 9/06
[52] U.S. Cl. .......................... 395/652; 395/186; 395/163
[58] Field of Search ..................... 395/651, 652, 395/653, 186, 188.01, 163, 164

[56] References Cited

U.S. PATENT DOCUMENTS

| | | | |
|---|---|---|---|
| 4,890,223 | 12/1989 | Cruess et al. | 364/200 |
| 5,297,268 | 3/1994 | Lee et al. | 395/425 |
| 5,592,641 | 1/1997 | Fandrich et al. | 395/430 |

*Primary Examiner*—Kevin A. Kriess
*Attorney, Agent, or Firm*—William H. Murray; N. Stephan Kinsella

[57] ABSTRACT

A status parameter is set for a storage area of a computer system to a read-only status. An access key is received from an access key call by a caller. The status parameter is changed to a write-permissible status if the access key matches a master access key. A request to perform a write to the storage area is received, and the write is allowed only if the status parameter has been set to the write-permissible status. The status parameter is reset to the read-only status after the write is performed.

30 Claims, 2 Drawing Sheets

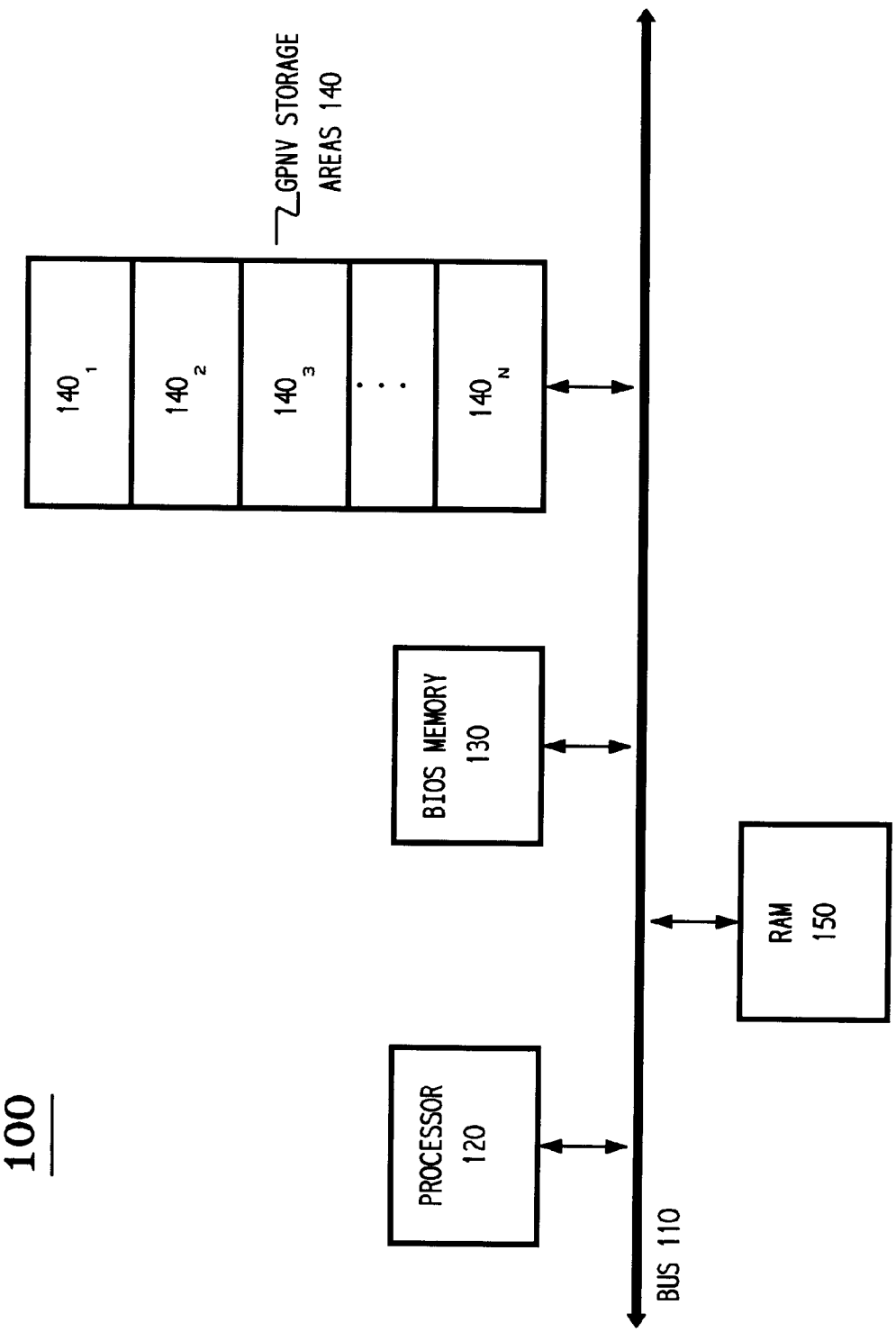

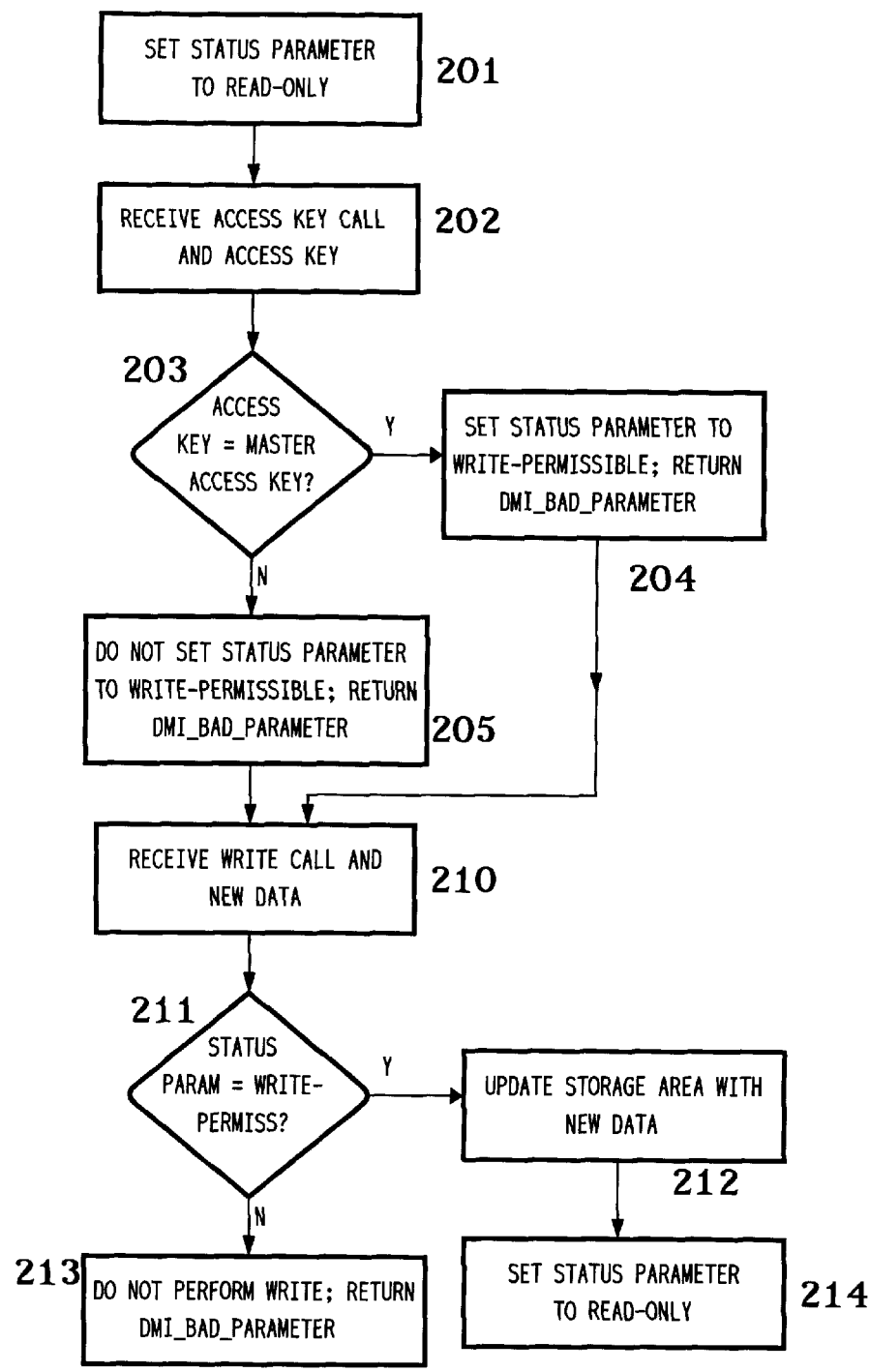

ACCESS KEY PROTECTION FOR COMPUTER SYSTEM DATA

BACKGROUND OF THE INVENTION

1. Field of the Invention

The present invention relates to the field of data storage in a computer system and, more particularly, to prevention of unauthorized changes to data stored in a computer system.

2. Description of the Related Art

Computer technology is continuously advancing, resulting in modern computer systems that provide ever-increasing performance. One result of this improved performance is an increased use of computer systems by individuals in a wide variety of business, academic and personal applications. With the increased use of and demand for computer systems, a large number of manufacturers, developers, and suppliers of computer systems, components, and software have come into existence to service the demand.

The large number of manufacturers, developers, and suppliers, combined with the flexibility afforded them due to the advances in technology, has resulted in a wide range of methods by which computer systems operate. Typically, in order for different components within a computer system to work together effectively, each must agree on certain specific operating parameters. Often, standards or specifications are adopted or agreed upon by various industries or groups of companies which define certain operating parameters. Thus, if two components comply with the same standard(s) or specification(s), then the two components should be able to work together effectively in the same system.

For example, one such standard is the Plug and Play BIOS [basic input/output system] Specification (version 1.0A, May 5, 1994). A component which conforms to the Plug and Play BIOS Specification should work properly in a system which also complies with the Plug and Play BIOS Specification by simply interconnecting the components to the system. Components that do not comply with the Plug and Play BIOS Specification may require additional configuration steps to be taken by the user before they function properly with one another.

Another current standard is the Desktop Management BIOS Specification (version 2.0, published Mar. 6, 1996) (hereinafter referred to as the DMI BIOS Specification), the entirety of which is incorporated herein by reference. This specification includes a Desktop Management Interface (DMI). The DMI BIOS Specification provides, among other advantages, general purpose nonvolatile (GPNV) data areas which can be accessed to store various data by various applications running on the system.

The DMI BIOS Specification, however, lacks suitably flexible mechanisms to prevent an application from performing an unauthorized modification of data stored in one of these GPNV data areas. For example, a GPNV data area may store vital manufacturing data the modification of which may be done for fraudulent purposes. Thus, it would be beneficial to provide mechanisms for restricting write access to selected GPNV data areas to prevent unauthorized changes to the data stored therein.

Additionally, in order to maintain compliance with the DMI BIOS Specification, any protection against unauthorized updates to GPNV data areas must not violate the DMI BIOS Specification.

SUMMARY

Unauthorized write access to a storage area in a computer system is prevented by setting a status parameter to a read-only status. An access key is received from an access key call by a caller. The status parameter is changed to a write-permissible status if the access key matches a master access key. A request to perform a write to the storage area is received, and the write is allowed only if the status parameter has been set to the write-permissible status. The status parameter is reset to the read-only status after the write is performed.

BRIEF DESCRIPTION OF THE DRAWINGS

These and other features, aspects, and advantages of the present invention will become more fully apparent from the following description, appended claims, and accompanying drawings in which:

FIG. 1 shows a block diagram of a computer system in accordance with an embodiment of the present invention; and FIG. 2 is a flow chart illustrating a method of protecting storage areas from unauthorized writes by using manufacturing access keys, in accordance with an embodiment of the present invention.

DESCRIPTION OF THE PREFERRED EMBODIMENT

The present invention provides a mechanism for protecting data saved in a storage area from unauthorized writes by using access keys. The storage area, which typically contains sensitive information such as manufacturing data, may be a GPNV memory or storage area. BIOS sets a status parameter for the storage area, which may also be stored in GPNV memory, to a read-only status. When a call is made, for example a DMI call by a caller, to write to the storage area, the write is not allowed if the status parameter indicates read-only access. A access key call is made by a caller from DMI, which passes an access key to BIOS. If the access key matches a master access key, BIOS changes the status parameter to write status; if not, the status parameter remains set to read only status. Thereafter, when a call is received requesting a write to the storage area, the write is permitted if the status parameter had previously been changed to write status. After the write is performed, the status parameter is reset to read-only status. For purposes of this application, write calls also include erase calls, since an erase call effectively replaces the data stored in a storage area with new data representing zero, null, or some other predetermined data associated with erases. The above-described mechanism is implemented, in one embodiment, on a computer system such as computer system 100 depicted in block diagram form in FIG. 1.

System Hardware

Computer system 100 comprises a bus 110, a processor 120, a BIOS memory 130, GPNV data storage 140, and a random access memory (RAM) 150, interconnected as shown. The BIOS memory 130 stores a sequence of instructions (sometimes referred to as the BIOS) which allows the processor 120 to input data from and output data to input/output (I/O) devices such as display devices and mass storage devices (not shown). In one embodiment, when the system 100 is reset, the contents of BIOS memory 130 are copied into RAM 150 for access by the processor 120. Alternatively, processor 120 may access the BIOS memory 130 directly via bus 110. The BIOS memory 130 can be any of a wide variety of conventional nonvolatile data storage devices, such as a read only memory (ROM), Flash memory (sometimes referred to as Flash devices), an erasable programmable read only memory (EPROM) or an electrically erasable programmable read only memory (EEPROM).

In one embodiment of the present invention, the BIOS stored in BIOS memory 130 is compliant with the DMI BIOS Specification. The DMI BIOS Specification includes a DMI, which uses GPNV data areas, shown in FIG. 1 as GPNV storage areas 140. Thus, when an application desires access to the GPNV storage areas 140, it must issue one or more DMI calls to one of the procedures provided by the BIOS. These procedures are described in more detail below.

Multiple GPNV storage areas 140 can be used in a computer system. The system 100 as shown includes n GPNV storage areas 140. In one implementation, n is equal to three. Each of the GPNV areas 140 can be of any size. The GPNV storage areas 140 can be used to store any of a wide variety of information. In one embodiment, the GPNV storage areas 140 are used to store data relating to the identification of hardware components in the system 100. For example, this identification can include the serial numbers and model numbers of each piece of hardware (e.g., display devices, mass storage devices, multimedia cards, and the like) in the system 100.

DMI Function Calls

DMI supports a structure access interface and a GPNV storage interface. Various types of information may be stored in GPNV memory and accessed by the GPNV storage interface, for example through DMI functions 56h (Read GPNV), which reads the entire specified GPNV contents into a buffer specified by the caller; and 57h (Write GPNV), which copies the contents of a user-specified buffer into the specified GPNV memory. Such function calls contain a "handle" to the GPNV storage area of which the read (or write) is requested, and the address of a buffer in which the data is to be stored (or containing the new data to be written). DMI function 55h (Get GPNV Information) returns information to a caller about a specified GPNV storage area. The information stored in GPNV storage areas may include manufacturing information, such as the serial number of the motherboard. Data stored in GPNV storage areas that is accessible via the GPNV storage interface will be referred to herein as GPNV data.

"Structures," sometimes referred to as strings because of the strings of data stored therein, may also be stored in GPNV memory and accessed by the structure access interface, for example through DMI function 52h (Set DMI Structure), which copies the information for the specified DMI structure from the buffer specified by the caller. These structures are organized in Types and may also contain sensitive information. These Types include system information (Type 1), which defines attributes of the overall system; base board information (Type 2), which defines attributes of the system's baseboard, also known as the motherboard or planar; and system enclosure or chassis information (Type 3), which defines attributes of the system's mechanical enclosures. Each DMI structure has a formatted section and an optional unformatted section. The formatted section of each structure begins with a 4-byte header. Remaining data in the formatted section is determined by the structure Type, as is the overall length of the formatted section. The unformatted section of the structure is used for passing variable data such as text strings. A DMI_Bad_Parameter return code (value 84h) is returned after various calls are made, to indicate an invalid parameter or, in the case of a DMI function 52h (Set DMI Structure), to indicate an invalid value detected for a to-be-changed structure field. Data stored in DMI structures, which may be stored within a dedicated GPNV storage area, will be referred to herein as structure data.

DMI also provides a control function 54h, which provides an interface to perform implementation-specific functions, as defined by a SubFunction parameter and its optional Data values. In particular, SubFunction range 4000 h-FFFFh is reserved for use by BIOS.

In one embodiment, one of the GPNV areas 140 is 128 bytes, a second is 256 bytes, and a third is 384 bytes. The GPNV storage areas 140 can be implemented using any of a wide variety of nonvolatile storage devices, such as blocks of Flash memory cells, EEPROMs, battery-backed complimentary metal oxide semiconductor (CMOS) cells, and the like. Each GPNV storage area may be identified using a 4-byte ASCII identifier. Thus, GPNV storage area $140_1$ may identified by the identifier "ABCD", storage area $140_2$ by "ABXY", and storage area $140_3$ by "GGYN". In one embodiment, GPNV storage area $140_1$ is a 256-byte storage area used by the BIOS for storing a backup image of CMOS-related information; GPNV storage area $140_2$ is a 128-byte storage area used by the manufacturer for storing process and test data; and GPNV storage area $140_3$ is a 384-byte storage area used by DMI BIOS extensions for storing DMI-related information such as manufacturer ID, serial numbers, asset tags, and chassis information, which may be read using the DMI function call 56h (Read GPNV Data) or 51h (Get DMI Structure) and written with DMI function call 52h (Set DMI Structure). Thus, GPNV storage area $140_3$ may be utilized to store the structure data of Types 1, 2, and 3, described previously.

In one embodiment, GPNV storage area $140_3$ stores a 4-byte header plus four strings for each of Types 1, 2, and 3 structures, in addition to other information. In one embodiment, GPNV storage area $140_3$ stores, at predetermined offsets, the following strings as illustrated in Table 1, in addition to other information:

TABLE 1

| Name | Structure Type | String Number |
|---|---|---|
| System Info Manufacturer | 1 | 1 |
| System Info Product Name | 1 | 2 |
| System Info Version | 1 | 3 |
| System Info Serial Number | 1 | 4 |
| Base Board Manufacturer | 2 | 1 |
| Base Board Product | 2 | 2 |
| Base Board Version | 2 | 3 |
| Base Board Serial Number | 2 | 4 |
| Chassis Manufacturer | 3 | 1 |
| Chassis Version | 3 | 2 |
| Chassis Serial Number | 3 | 3 |
| Chassis Asset Tag | 3 | 4 |

Manufacturing Access Keys

Referring now to FIG. 2, there is shown a flow chart illustrating a method 200 of protecting storage areas such as GPNV storage areas 140 from unauthorized writes by using manufacturing access keys, in accordance with an embodiment of the present invention. Method 200 provides a means for protecting sensitive data, including both GPNV data and structure data, from unauthorized writes. As explained hereinabove, both GPNV data and structure data may contain sensitive information such as manufacturing data, and may be stored in a certain GPNV storage areas 140. For purposes of the present invention, "writes" also include erases, since an erase effectively replaces the data stored in a storage area with new data representing zero, null, or some other predetermined data associated with erases. Thus, as used herein, a write call requesting to write to a storage area includes both a write in which old data in the storage area is overwritten with new data supplied by the call, and erases in which the data in a storage area is erased. Therefore, for purposes of this application, a request to write to a storage area includes any call that requests that the data stored in a storage area be changed. A read call thus does not constitute a write, while an erase call does.

As shown in FIG. 2, a call is made by a caller to write data in certain GPNV storage areas (step 210). In one embodiment, the data to be updated by the write call is manufacturing sensitive data, and the write call can either be a call to write new data to a manufacturing sensitive GPNV data area (typically, a specific GPNV storage area $140_2$ dedicated to storing such manufacturing sensitive GPNV data) or a call to erase manufacturing sensitive structure data (such as Type 2 DMI structures, which are stored in GPNV storage area $140_3$). If the caller desires to write new GPNV data in a given GPNV storage area, a DMI function call 57$h$ will be received by BIOS to instruct BIOS to copy the contents of a caller-specified buffer into the specified GPNV storage area. If the caller desires to erase a string of data in a given structure, a DMI function call 54$h$, erase subfunction 4000h-FFFFh, will be received by BIOS, to instruct BIOS to erase the string in the specified DMI structure. In either case, method 200 operates as follows.

Manufacturing sensitive data thus includes structures of Type 2, stored in GPNV storage area $140_3$ along with structures of other Types; and information such as the serial number of the motherboard, system ID numbers, and process information, stored in GPNV storage area $140_2$.

A master "manufacturing access key" is stored in BIOS memory 130, and a "status parameter" is also stored in a GPNV storage area. The status parameter contains a value which indicates either that none of the manufacturing specific data may be updated by a write call (i.e., a "read-only" status), or that any of the manufacturing specific data may be updated by a write call (a "write-permissible" status). As explained previously, since write calls include normal write calls and erase calls, a write-permissible status allows both writes to and erases of manufacturing specific data.

Initially, the status parameter is set to read-only status (step 201). Before a successful write call can be issued by a caller to update manufacturing specific data, the status parameter must be changed from read-only to write-permissible status. This is performed with a "manufacturing access key" function which is implemented via DMI control function 54H, with a SubFunction between the 4000 h-FFFFh range. When a caller calls the manufacturing access key function, an access key is passed to BIOS within a data structure provided by the caller (step 202). If the access key matches the master access key, then the call is successful and BIOS changes the status parameter from read-only to write-permissible (steps 203, 204). Thereafter, a write call to change manufacturing sensitive data can successfully be made, as explained below. However, if the access key does not match the master access key, then the call is unsuccessful and the read-only status of the status parameter remains unchanged (steps 203, 205). In one embodiment, the master access key is a 24-byte alphanumeric key that is known only to the manufacturer.

If a write call is issued by a caller to BIOS that instructs BIOS to write data to (or erase data in) any of these manufacturing specific data areas (step 210), BIOS checks the status parameter value (step 211). If the status parameter indicates read-only, BIOS rejects the call and returns a DMI__Bad__Parameter error to the caller (steps 211, 213). If the status parameter indicates that write is permissible, BIOS performs the write (steps 211, 212). The write operation performed is either a DMI function call 57$h$ to update GPNV data with new data, or a DMI control function call FFFF with a SubFunction between the 4000 h-FFFFh range that erases structure data. Once a successful write is performed, BIOS resets the status parameter to read-only status (step 214). Further, for security purposes, BIOS resets the status parameter to read-only status after any DMI call is made, including a successful write call.

Thus, with method 200 of the present invention, unauthorized callers will typically not have knowledge of the master access key, and will thus be unable to change the status parameter to write-permissible, and BIOS will thus reject any write calls that attempt to change manufacturing sensitive data. This allows vital product data that is specific to the manufacturing process to be modified by those having access to the master access key, for example the manufacturer that needs to modify the data after the motherboard is returned to the manufacturer for some reason, but prevents such modification by unauthorized users.

In one embodiment, the master access key used by the present invention and an indicator of its corresponding GPNV storage area(s) are embedded (e.g., hard-coded) in the sequence of instructions stored in the BIOS memory 130. In an alternate embodiment, the master access key is stored in a reprogrammable nonvolatile storage device (such as a Flash memory) coupled to the bus 110.

In the discussions above, the present invention is described with reference to DMI and the DMI BIOS Specification. It is to be appreciated, however, that the present invention is not limited to computer systems operating in accordance with the DMI BIOS Specification or with DMI, but is also applicable to systems with a BIOS which supports lock values in substantially the same manner as DMI.

In one embodiment, method 200 is implemented through a sequence of instructions executed on the processor 120. Initially, the sequence of instructions is stored in the BIOS memory 130. When the computer system is reset, the instructions are copied from the BIOS memory 130 into the RAM 150 and then accessed and executed by the processor 120. In another embodiment, the sequence of instructions is stored on another nonvolatile memory device which is part of or is coupled to the system 100, such as a hard disk, an optical disk, or a removable floppy disk. The sequence of instructions can be loaded into the RAM 150 after an initial portion of the BIOS which includes instructions on how to access the memory device (e.g., the hard disk) has been loaded into the RAM 150. Thus, as will be appreciated, method 200 may be implemented in a DMI BIOS extension.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for preventing unauthorized write access to a storage area in a computer system, the method comprising the steps of:
   (a) setting a status parameter for the storage area to a read-only status;
   (b) receiving an access key from an access key call by a caller;
   (c) changing the status parameter to a write-permissible status if the access key matches a master access key;
   (d) receiving a request to perform a write to the storage area;
   (e) allowing the write only if the status parameter has been set to the write-permissible status; and
   (f) resetting the status parameter to the read-only status after the write is performed, wherein steps (a)–(f) are performed under the control of a basic input/output system (BIOS).

2. The method of claim 1, wherein step (f) comprises the step of resetting the status parameter to the read-only status after any call is received by the BIOS.

3. The method of claim 1, wherein the storage area is a general purpose non-volatile (GPNV) storage area.

4. The method of claim 3, wherein step (d) comprises the steps of receiving a request via a write function call to perform a write of new GPNV data to the storage area, wherein the storage area is for storing GPNV data.

5. The method of claim 3, wherein step (d) comprises the step of receiving a request via an erase subfunction call of a control function call to perform an erase of a structure stored in the storage area, wherein the structure is for storing structure data.

6. The method of claim 1, wherein:
   the storage area is a GPNV storage area;
   the computer system comprises a second GPNV storage area and a BIOS memory; the method further comprising the steps of:
   storing the master access key in the BIOS memory; and
   storing the status parameter in the second GPNV storage area.

7. The method of claim 1, wherein step (c) comprises the step of changing the status parameter via an access key subfunction call of a control function call to a write-permissible status if the access key matches the master access key.

8. In a computer system, a subsystem for preventing unauthorized write access to a storage area of the computer system, the subsystem comprising:
   (a) means for setting a status parameter for the storage area to a read-only status;
   (b) means for receiving an access key from an access key call by a caller;
   (c) means for changing the status parameter to a write-permissible status if the access key matches a master access key;
   (d) means for receiving a request to perform a write to the storage area;
   (e) means for allowing the write only if the status parameter has been set to the write-permissible status; and
   (f) means for resetting the status parameter to the read-only status after the write is performed, further comprising a BIOS comprising means (a)–(f).

9. The subsystem of claim 8, wherein means (f) comprises means for resetting the status parameter to the read-only status after any call is received by the BIOS.

10. The subsystem of claim 8, wherein the storage area is a GPNV storage area.

11. The subsystem of claim 10, wherein means (d) comprises means for receiving a request via a write function call to perform a write of new GPNV data to the storage area, wherein the storage area is for storing GPNV data.

12. The subsystem of claim 12, wherein means (d) comprises means for receiving a request via an erase subfunction call of a control function call to perform an erase of a structure stored in the storage area, wherein the structure is for storing structure data.

13. The subsystem of claim 8, further comprising:
   a second GPNV storage area and a BIOS memory, wherein the storage area is a GPNV storage area;
   means for storing the master access key in the BIOS memory; and
   means for storing the status parameter in the second GPNV storage area.

14. The subsystem of claim 8, wherein means (c) comprises means for changing the status parameter via an access key subfunction call of a control function call to a write-permissible status if the access key matches the master access key.

15. A computer-readable medium having stored thereon a plurality of instructions, wherein the plurality of instructions, when executed by a processor of a computer system having a storage area, cause the processor to perform the steps of:
   (a) setting a status parameter for the storage area to a read-only status;
   (b) receiving an access key from an access key call by a caller;
   (c) changing the status parameter to a write-permissible status if the access key matches a master access key;
   (d) receiving a request to perform a write to the storage area;
   (e) allowing the write only if the status parameter has been set to the write-permissible status; and
   (f) resetting the status parameter to the read-only status after the write is performed, wherein steps (a)–(f) are performed under the control of a BIOS.

16. The computer-readable medium of claim 15, wherein step (f) comprises the step of resetting the status parameter to the read-only status after any call is received by the BIOS.

17. The computer-readable medium of claim 15, wherein the storage area is a GPNV storage area.

18. The computer-readable medium of claim 17, wherein step (d) comprises the step of receiving a request via a write function call to perform a write of new GPNV data to the storage area, wherein the storage area is for storing GPNV data.

19. The computer-readable medium of claim 17, wherein step (d) comprises the step of receiving a request via an erase subfunction call of a control function call to perform an erase of a structure stored in the storage area, wherein the structure is for storing structure data.

20. The computer-readable medium of claim 15, wherein:
   the storage area is a GPNV storage area;
   the computer system comprises a second GPNV storage area and a BIOS memory;
   the plurality of instructions cause the processor to perform the further steps of:

storing the master access key in the BIOS memory; and storing the status parameter in the second GPNV storage area.

21. The computer-readable medium of claim 15, wherein step (c) comprises the step of changing the status parameter via an access key subfunction call of a control function call to a write-permissible status if the access key matches the master access key.

22. A computer system, comprising:

a processor;

a storage area coupled to the processor;

a BIOS stored in memory coupled to the processor, the BIOS including instructions which, when executed by the processor, cause the processor to:

(a) set a status parameter for the storage area to a read-only status;

(b) receive an access key from an access key call by a caller;

(c) change the status parameter to a write-permissible status if the access key matches a master access key;

(d) receive a request to perform a write to the storage area;

(e) allow the write only if the status parameter has been set to the write-permissible status; and (f) reset the status parameter to the read-only status after the write is performed.

23. The computer system of claim 22, wherein the BIOS:

(f) resets the status parameter to the read-only status after any call is received by the BIOS.

24. The computer system of claim 22, wherein the storage area is a GPNV storage area.

25. The computer system of claim 24, wherein, when the BIOS receives the request to perform the write to the storage area, the BIOS receives a request via a write function call to perform a write of new GPNV data to the storage area, wherein the storage area is for storing GPNV data.

26. The computer system of claim 24, wherein, when the BIOS receives a request via an erase subfunction call of a control function call to perform an erase of a structure stored in the storage area, wherein the structure is for storing structure data.

27. The computer system of claim 22, wherein the storage area is a GPNV storage area, the computer system further comprising a second GPNV storage area and a BIOS memory; wherein the BIOS stores the master access key in the BIOS memory and stores the status parameter in the second GPNV storage area.

28. A method for preventing unauthorized write access to a storage area in a computer system, the method comprising the steps of:

(a) setting a status parameter for the storage area to a read-only status, wherein the status parameter is stored in a second storage area of the computer system;

(b) receiving an access key from an access key call by a caller;

(c) changing the status parameter to a write-permissible status if the access key matches a master access key;

(d) receiving a write request to perform a write to the storage area;

(e) allowing the write only if the status parameter has been set to the write-permissible status; and (f) resetting the status parameter to the read-only status after the write is performed.

29. The method of claim 28, wherein the write request is separate from the access key call.

30. The method of claim 29, wherein step (f) comprises the step of resetting the status parameter to the read-only status after the write is performed or after any other call is made by the caller.

* * * * *